No. 749,830. Patented January 19, 1904.

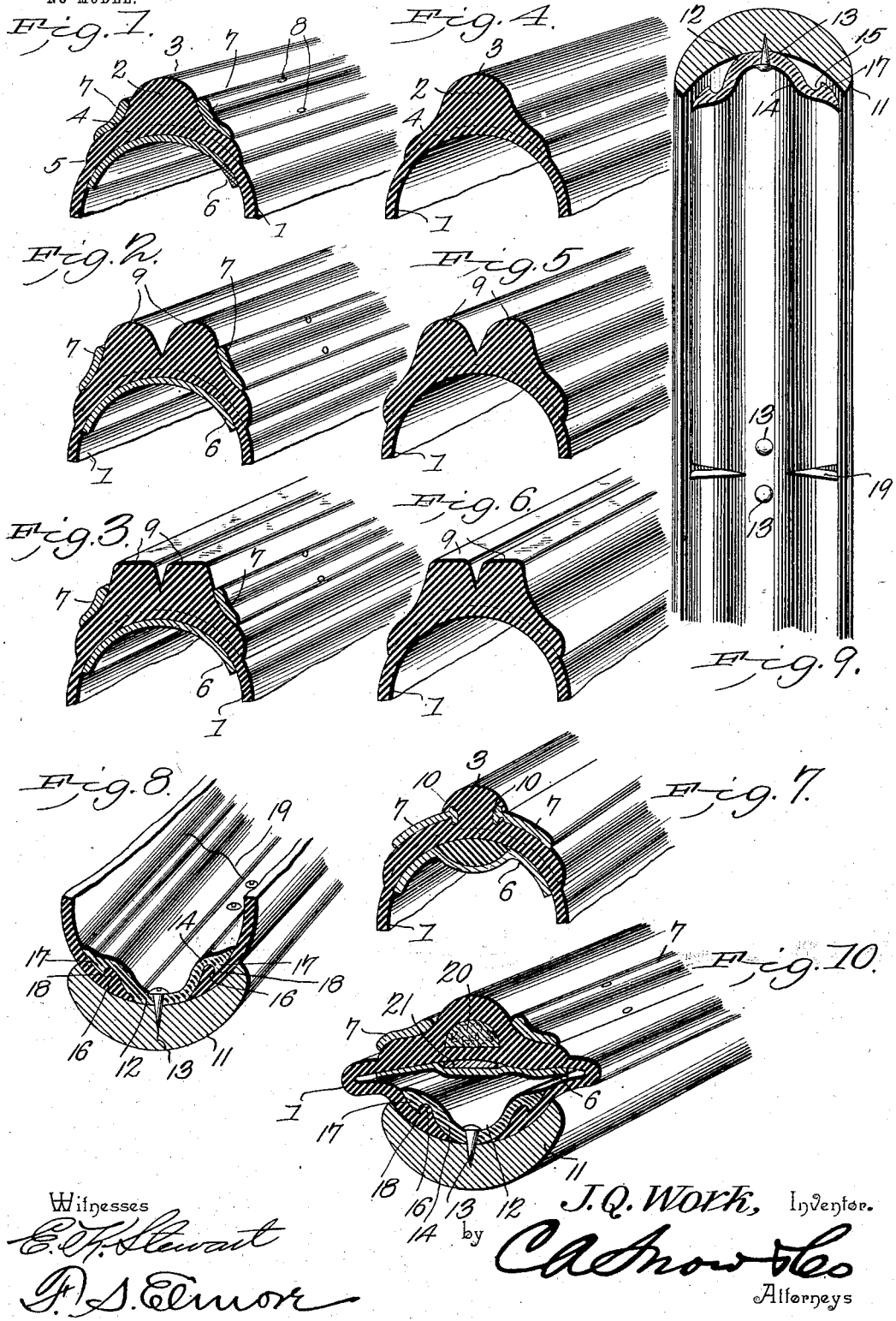
No. 749,830. PATENTED JAN. 19, 1904.
J. Q. WORK.
VEHICLE TIRE.
APPLICATION FILED JUNE 30, 1903.
NO MODEL.

UNITED STATES PATENT OFFICE.

JOSIAH Q. WORK, OF LAMAR, MISSOURI.

VEHICLE-TIRE.

SPECIFICATION forming part of Letters Patent No. 749,830, dated January 19, 1904.

Application filed June 30, 1903. Serial No. 163,776. (No model.)

*To all whom it may concern:*

Be it known that I, JOSIAH Q. WORK, a citizen of the United States, residing at Lamar, in the county of Barton and State of Missouri, have invented a new and useful Vehicle-Tire, of which the following is a specification.

My invention relates to vehicle-tires of the pneumatic type such as are employed upon velocipedes, automobiles, or the like, and has for its objects to produce a device of this character of comparatively simple construction, which in practice will be strong and durable, one which will be non-puncturable, one which may be readily detached from the wheel, and one which may be readily applied to any type of wheel-rims now in general use.

To these ends the invention comprises the novel details of construction and combination of parts more fully hereinafter described.

In the accompanying drawings, Figure 1 is a perspective view of a portion of a tire, illustrating my improved tread in its preferred form. Figs. 2 and 3 are similar views illustrating slightly-modified forms of the same. Figs. 4, 5, and 6 are similar views illustrating the forms of tread shown in Figs. 1, 2, and 3, respectively, with the armatures removed. Fig. 7 is a similar view showing a modification in the manner of attaching the armatures. Fig. 8 is a similar view illustrating the means for attaching the tire to the rim. Fig. 9 is a similar view showing the tire-engaging devices in releasing position and the tire omitted. Fig. 10 is a similar view illustrating the complete tire, together with slight modifications in the tread portion thereof.

Referring to the drawings, and especially to Figs. 1, 2, and 3 thereof, 1 indicates the outer tube of a tire composed of rubber or other suitable flexible impervious material, upon the outer face of which is formed a thickened or enlarged portion 2, which constitutes the tread of the tire and consists of rubber or the like formed integral with the tire or applied thereto by vulcanization or cement. This tread in cross-section presents, preferably, as illustrated in Fig. 1, a substantially semicircular outer face 3, which terminates at opposite sides in angularly-disposed substantially flat faces 4, which in turn at their outer longitudinal edges curve or taper abruptly downward to the point 5 of meeting with the outer face of the tube or tire proper. 6 indicates a covering of thick canvas or other suitable material which is applied to the inner surface of tube 1 and extends transversely thereof between the points 5 5 beneath the tread portion 2 of the tire to strengthen the tube at this part and prevent wearing thereof at the points 5 5 incident to the yielding of the tube along the edges of the tread portion during the travel of the tire over the ground. 7 7 are armor-plates of any suitable metal, but preferably of aluminium, which are applied to the flattened faces 4 of the tread portion 2 and longitudinally thereof, said plates being of a transverse width sufficient to extend from the point of juncture of the curved outer surface 3 with the flattened face 4 to a point suitably distant from the outer edge of the latter to prevent contact of the outer edge of the plate with the tube 1, contact of the inner edge of the plate with the ground-surface being prevented, owing to the outward curvature of surface 3. The plates 7 are preferably attached to the tread portion 2 by means of rivets 8. It is to be particularly noted that owing to the forming of the central longitudinal bead or rib having the outwardly-curved face 3 upon the tread portion of the tire but a small percentage of the latter will contact with the ground, and the travel of the latter thereover will be rendered light and easy. It is also to be noted that owing to the thickness of the tire at the point which contacts with the ground liability of puncturing is entirely obviated at such point, while puncturing of the tread portion of the tire at the sides of the central rib is prevented by the armature 7, while at the same time the yieldability and cushioning properties of the tire are in no wise affected.

In Fig. 2 the tread portion 2 of the tire is shown as provided with a pair of longitudinal ribs or beads 9 9, the outer faces of which are rounded, while in Fig. 3 the outer faces of said beads are illustrated as being flattened. Otherwise the tread portion of the tires illustrated in said figures are identical in construction and operation with that of Fig. 1.

In Figs. 4, 5, and 6 the tread portions of the tires are shown as made in the forms corresponding to Figs. 1, 2, and 3, respectively, but with the armatures omitted. In the forms of tires in which the armor-plates are dispensed with the thickness of the tread alone is dependent upon to produce non-puncturing of the tire, and while the thickened tread portion will be sufficient in many instances to insure non-puncture and the cost of the production of the tire will be reduced by the omission of the armor-plates it is preferable to employ the latter, as puncturing of the tire is thereby entirely obviated.

In Fig. 7 I have shown the plates 7 attached to the tread by means of laterally-projecting flanges 10, formed upon the inner longitudinal edge of each plate, the flanged edges being embedded in the material of the tread at the point of juncture of the central longitudinal rib thereof with the flattened faces 4.

My improved tire is attached to the rim 11 of the wheel, as illustrated in Figs. 8 and 9, by means of an attaching member 12, secured at its transverse center to the rim, preferably by means of screws 13, having broad flattened heads. This attaching member is composed of any suitable flexible non-elastic material, but consists, preferably, of rubber having a layer or layers of cotton or other fibrous material embedded therein, whereby stretching of the rubber is prevented. The member 12 is molded or otherwise formed and consists of a thickened central portion, the inner face of which bears upon the inner face of the wheel-rim and side flaps 14, which are flexible and free to swing toward and from the rim when the tire is removed or deflated, said flaps being provided each upon its outer face with a longitudinal groove or recess 15, formed adjacent to the outer edge of the flap for the reception of a coincident flange 16, formed longitudinally of the tire adjacent to its edge, said recess 15 presenting an inwardly-extending flange 17, which seats within a coincident groove or recess 18, formed in the tire, whereby the flanges 16 and 17 of the tire and attaching member, respectively, will interlock and escape of the tire, owing to internal air-pressure upon the member 12, will be prevented. Formed at intervals in the flaps 14 are transversely-disposed V-shaped slits or notches 19, which extend from the outer edges of the flaps inward to the point of juncture thereof with the central thickened portion of the member and which permit of the free manipulation of the flaps during the operation of attaching or detaching the tire. Attention is here directed to the fact that the rim 11 does not have to be of any especial construction to permit application of my tire thereto, inasmuch as the tire and rim in no wise interlock or interengage, the maintaining of the tire upon the rim being wholly due to the attaching member 12, which may be applied to any of the ordinary types of rims now in general use. Attention is also directed to the fact that engagement of the tire with the wheel-rim is obviated and the attendant advantages gained, owing to the fact that the member is composed of a flexible but non-elastic material, whereby the member will unyieldingly sustain the transverse strains due to the air-pressure upon the interior of the tire, while at the same time the member may be readily manipulated for attachment or detachment of the tire when the latter is in deflated condition.

In Fig. 10 the tire is shown in a substantially deflated condition and the tread compressed toward the rim, as the parts would under such circumstances appear if the device were traveling over the ground in order to illustrate clearly the portions of the walls of the tire which yield in practice and through which the cushioning qualites of the tire are obtained and, further, to illustrate that the plates 7 will not, even under extraordinary circumstances, contact with the ground. This figure also illustrates a slight modification of the device in which the central portion of the tread is of tubular form and provided with a filling 20, of cork or other suitable light material, the purpose of which is to render the tire lighter in weight than when the entire tread portion is composed of rubber. In this form of the device I have also provided an armor-plate 21, which lies upon the inner face of the tire beneath the cork filling and is maintained in place by the canvas strip 6, said plate 21 serving to prevent puncturing of the tire by any object which may penetrate the cork filling 20.

From the foregoing it will be seen that I produce a tire of comparatively simple construction which may be readily applied to vehicle-wheels, one in which the tire will be detachable and non-puncturable. While I now believe the structure herein illustrated to be the best adapted for the attainment of the ends in view, it is to be understood that I do not limit myself to the details herein set forth, inasmuch as minor changes therein may be made without departing from the spirit of my invention. For example, I have, as shown in Fig. 7, made provision for thickening the tread portion of the tire by forming upon the inner face of the tire a longitudinal rib of soft rubber, and this inner rib may be employed in all of the forms of the device or dispensed with, as may be found desirable. I also propose when applying the device to tires of the double-tube type to employ an inner covering of canvas (not shown) applied over the tire-engaging device between the same and the inner tube, whereby engagement and cutting of the latter by the former will be obviated, as will be readily understood.

Having thus described my invention, what I claim is—

1. A tire comprising an inflatable tube having a thickened tread portion provided with a longitudinal centrally-disposed rib and armor-plates applied to the tread at opposite sides of the rib.

2. A tire comprising an inflatable tube having a thickened tread portion provided with a longitudinal centrally-disposed rib, armor-plates applied to the tread at opposite sides of the rib, and a strengthening-sheet applied to the inner face of the tube beneath the tread portion.

3. A tire comprising an inflatable tube having a thickened tread portion provided with a centrally-disposed hollow rib, a filling of cork or the like situated within the hollow rib, and an armature carried by the tire inwardly of the cork filling.

4. A tire comprising an inflatable tube having a thickened tread portion provided with a centrally-disposed hollow rib, a filling of cork or the like situated within the hollow rib, an armature carried by the tire inwardly of the cork filling, and armor-plates applied to the tread at opposite sides of the rib.

5. A tire comprising an inflatable tube having a thickened tread portion provided with a centrally-disposed hollow rib, a filling of cork or the like situated within the hollow rib, an armature disposed upon the inner face of the tire opposite the cork filling, a strengthening-sheet applied to the inner face of the tube over the armature, and armor-plates applied to the tread at opposite sides of the rib.

6. The combination with a wheel-rim, of an attaching member affixed thereto and having side flaps composed of a flexible non-elastic material slitted transversely at intervals, a longitudinal flange provided upon the outer face of each flap, and a tire having its edges disposed between the rim and flaps and provided upon its inner face with longitudinal flanges interchanging the flanges upon the flaps.

In testimony that I claim the foregoing as my own I have hereto affixed my signature in the presence of two witnesses.

JOSIAH Q. WORK.

Witnesses:
F. H. COMBS,
H. L. SCHNEBLEY.